United States Patent [19]
Lucien et al.

[11] 3,804,213
[45] Apr. 16, 1974

[54] DISC-BRAKE WITH HEAT-SINK USING GRAPHITE

[75] Inventors: Rene Lucien, Neuilly-sur-Seine; Jean Masclet, Paris, both of France

[73] Assignee: Messier-Hispano, Paris, France

[22] Filed: July 3, 1972

[21] Appl. No.: 268,755

[30] Foreign Application Priority Data
July 2, 1971   France .............................. 71.24346
Mar. 1, 1972   France .............................. 72.07087

[52] U.S. Cl. ...... 188/73.2, 188/218 XL, 188/251 A, 192/70.14, 192/107 R
[51] Int. Cl. ............................................ F16d 65/12
[58] Field of Search ........ 188/218 XL, 251 A, 73.2; 192/107 M, 107 R, 70.14

[56] References Cited
UNITED STATES PATENTS
| | | | |
|---|---|---|---|
| 3,483,953 | 12/1969 | Bender ......................... | 188/218 XL |
| 3,525,421 | 8/1970 | Sickle et al. ................ | 188/218 XL X |
| 3,548,979 | 12/1970 | Nelson et al. ............. | 188/218 XL X |
| 3,552,533 | 1/1971 | Nitz et al. .................. | 188/251 A X |
| 3,698,519 | 10/1972 | Crossman ................. | 188/218 XL X |

FOREIGN PATENTS OR APPLICATIONS
966,573   8/1964   Great Britain ................ 188/218 XL

*Primary Examiner*—George E. A. Halvosa
*Attorney, Agent, or Firm*—Eric H. Waters

[57] ABSTRACT

A disc-brake comprising rotors and stators fitted adjacent one another in alternating arrangement. Each of the intermediate rotors and stators is composed of a structure which includes a rim constituted of arcuate sectors placed next to each other and interconnected by connection means. The sectors have opposite faces and are provided on each of these faces with a cavity defined by two cylindrical recesses, the walls of which intercept along an axis of symmetry of the associated sector. Two graphite friction shoes are fitted into each recess and the shoes collectively define a shape substantially corresponding to that of the two recesses of the associated cavity. The friction shoes are fitted into the recesses by passing rivets through the associated sector, the shoes located on each side of the sector loosely receiving the rivets.

9 Claims, 9 Drawing Figures

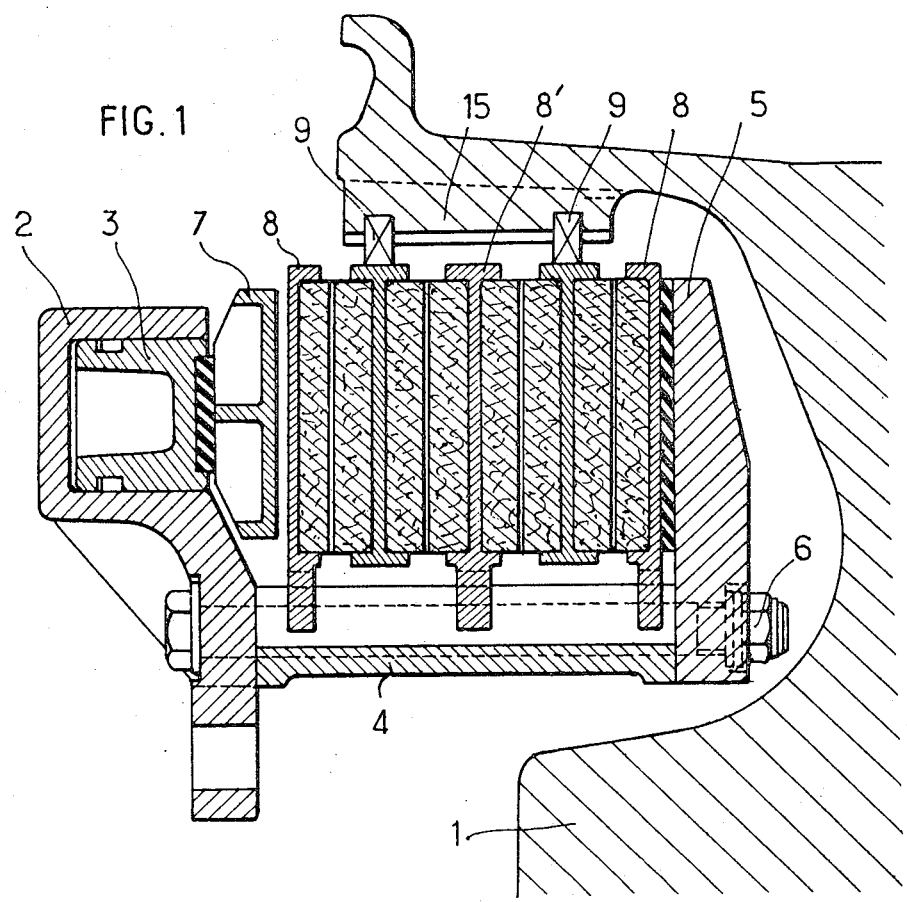
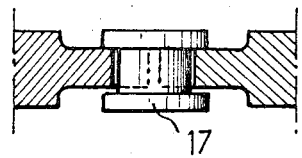
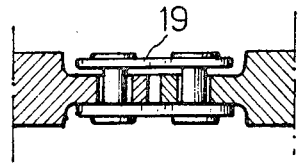
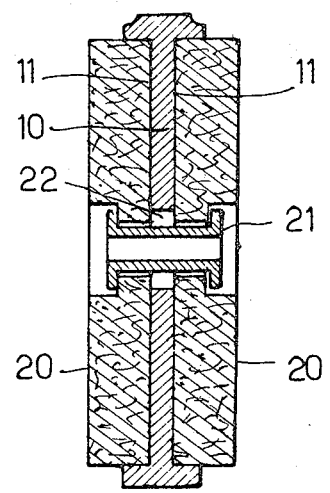

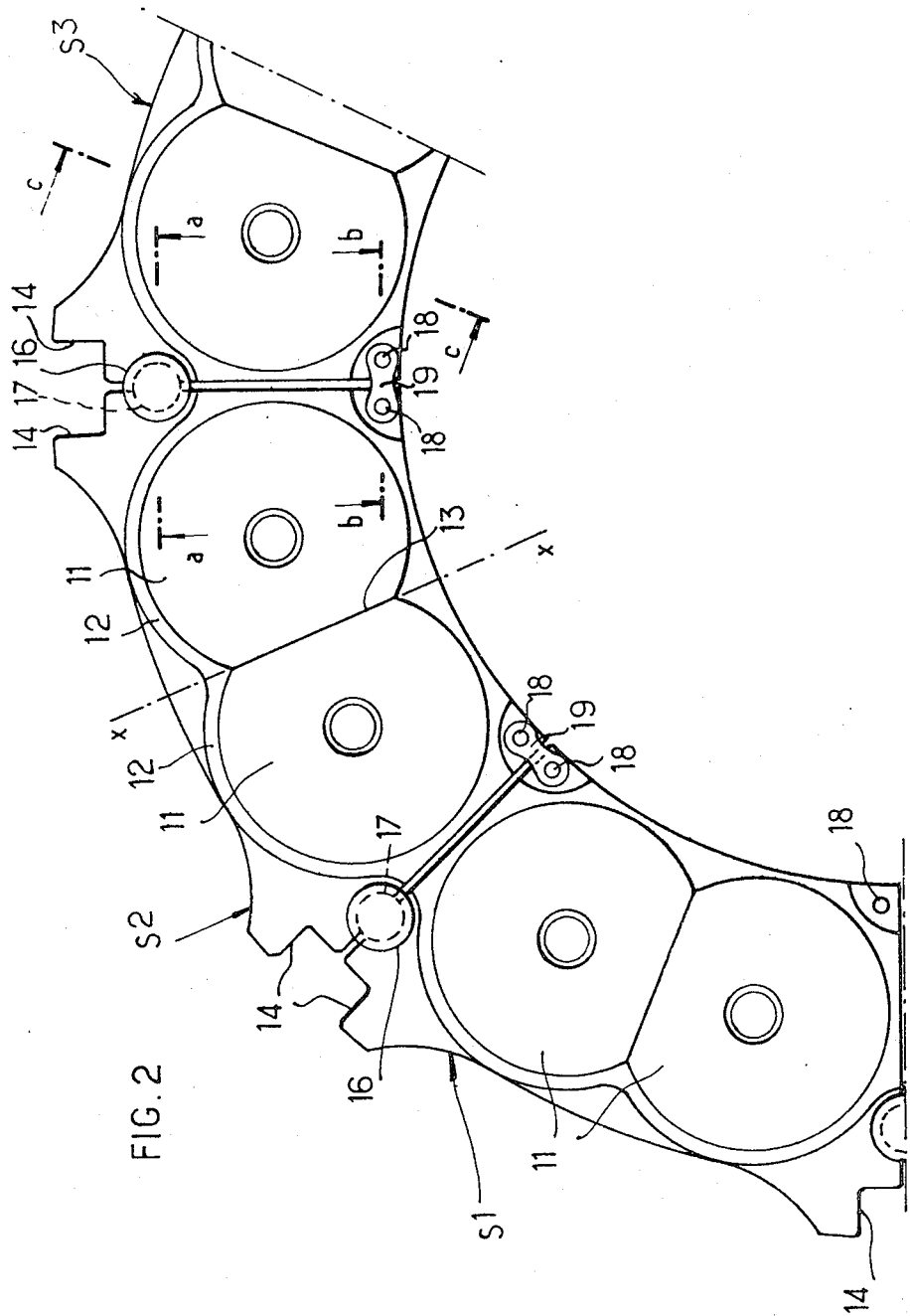

DISC-BRAKE WITH HEAT-SINK USING GRAPHITE

The present invention concerns disc-brakes in general, and in particular the friction linings of disc-brakes, i.e. those elements, either rotating or not, which by rubbing against each other generate the braking force and convert most of the kinetic energy into heat.

The design of this brake has been governed by considerations of an economic nature, and in this particular case by production costs and operating costs. It is in fact well known that the efforts on the part of users, both military and civil, to obtain the lowest possible operating costs have led to the establishment of a new requirement in space equipment in general and in brakes in particular, this requirement being that of low costs. The establishment of the lowest possible costs has thus become an important criterion in the promotion of a given item of equipment.

Research carried out by the present Applicants have led to the provision of a heat-sink using graphite, which achieves this object.

Disc-brakes are known in which the heat-sink using graphite is constituted by rotors in the form of discs containing cavities, whereas the stators are rings made up of associated sectors containing cavities.

An object of the present invention is to provide a modified form of such brakes which is characterized in that it comprises rotating structures or rotors and nonrotating structures or stators fitted to alternate with the rotating structures, said different structures each being constituted by a ring made up of interconnected arcuate sectors containing cavities in which graphite friction shoes are fitted.

It is well known that the use of discs divided into like arcuate sectors offers considerable advantages in eliminating deformation of the rotors and stators resulting from thermal stresses built up in the heat-sink during the braking operation.

Each cavity is defined by two cylindrical recesses, the lateral walls of which intersect each other on the axis of symmetry of the sector in question.

In one particular embodiment of the invention, the two shoes in each cavity, which fit precisely in the corresponding recesses, are constituted by flat cylindrical pellets, segments of which are cut off along a straight line, the pellets being fitted in the cavity with their cut faces presented to each other.

In a modified embodiment of the invention, a shoe in the form of a complete flat cylinder is inserted in one of the recesses of each cavity, and a shoe in the form of a lunule is inserted in the second recess, the inwardly curved portion of this latter shoe fitting exactly around the circular portion of the periphery of the first shoe which projects into the second recess.

In an improved form of the present invention, the armatures of the rotors and stators are made of graphite which is different from that of which the shoes are made.

Some forms of construction of the disc-brake of the invention will now be described by reference to the attached drawings, in which:

FIG. 1 is a partial radial section through the axis of rotation and through the axis of an operating piston and cylinder unit of a disc-brake in accordance with the invention;

FIG. 2 is an elevational view of the sectors forming the rotor;

FIGS. 3, 4 and 5 are partial sectional views, on a greater scale, taken on lines a-a, b-b and c-c of FIG. 2;

Figure 6:
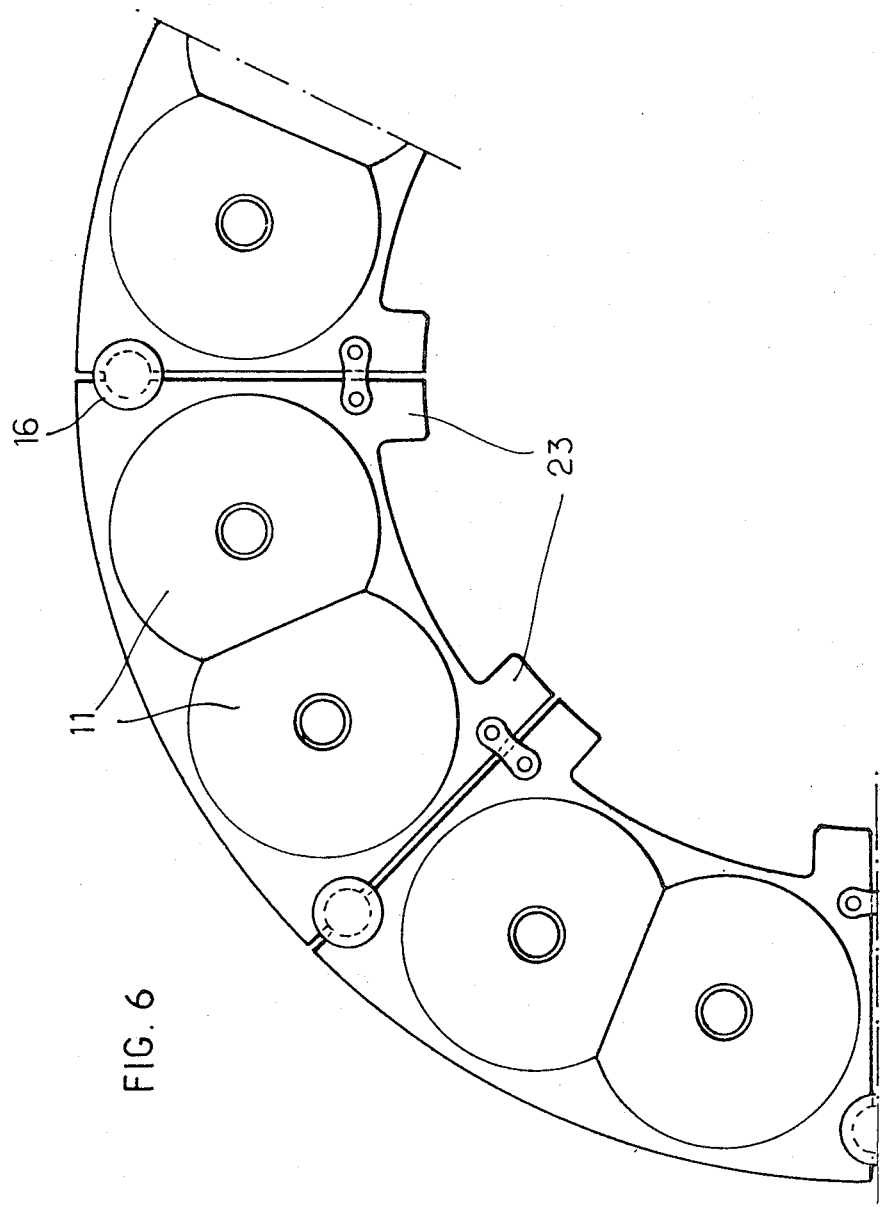
FIG. 6 is an elevational view of the sectors forming the stator.

Referring to Figure1, the brake, fitted in the wheel 1, comprises a frame constituted by a one-piece cylinder 2 with pressure-applying pistons 3, a torque-tube 4 absorbing the torque applied by the stators, a rear plate 5 against which the elements of the heat-sink are pressed by the pistons 3, screw-bolts 6 interconnecting said elements, and a thrust-plate 7 for evenly distributing the compressive force.

The heat-sink of the brake is constituted by either single stators 8—8, or double stators 8', and by a number of rotors 9—9. Each rotor and each stator is constituted by an assembly of like arcuate sectors, $S^1 - S^2 - S^3$ (FIG. 2).

Each of the sectors that form the rotors comprises a metallic armature 10 (FIG. 5) having a cavity 11 in each of its two faces. The general shape of these two cavities is defined by two cylinders 12 (FIG. 2), which intersect each other on the axis of symmetry 13 of the sector.

At the two corners of its outer periphery, each rotor sector contains a groove 14—14 to enable the sector to be driven through splines 15 on the wheel on which the brake is fitted. Another groove 16—16 of approximately semicircular cross-section is formed in each radial edge of each sector. The grooves in each two contiguous sectors register with each other and thus form a housing for accommodating a bobbin shaped metal pin member 17, the function of which is to prevent each sector from rocking about the corresponding driving spline on the wheel under the effect of the frictional forces.

Additionally, each rotor sector contains a hole 18 at the two corners of its inner periphery, each of these holes accommodating the pins of a chain-link 19. These links interconnect the sectors to form a segmental rotor ring. After the sectors have been fitted, the play between two contiguous sectors is of the order of 1 millimeter, that between each pin member 17 and the corresponding grooves 16 is of the order of a few tenths of a millimeter, and that between the chain-links 19 and the corresponding holes 18 is of the order of one millimeter.

In the cavities 11 in the sectors $S^1 - S^2$ etc., i.e. on each of the faces of these sectors, there are inserted, back-to-back, graphite friction shoes 20—20 (FIG. 5); there is slight play in the fitting of the shoes and they are each secured by means of a rivet 21 passing through a hole 22 in the armature 10, there being considerable play between the hole and the rivet. Because of this assembly, each graphite shoe is under compression within the walls of the cavities under the action of the forces set up by friction. All shearing forces in the vicinity of the fixing rivets 21 are prevented by the play in the holes 22 in the armatures 10.

The shape of each shoe corresponds to that of two flat cylinders positioned side-by-side and with a segment cut off from each along the line x—x (FIG. 2). These two elements are fitted in a cavity with their cut faces presented to each other; this method of fitting prevents rotation of the shoes about their fixing rivets under the action of the frictional forces.

In accordance with a further feature of the invention, each of the rings constituting a rotor is segmented at the middle of the driving heads corresponding to the splines on the wheels; this arrangement prevents any pinching of the splines by the rotor as a result of the latter becoming deformed by thermal stresses. Thus, in the event of accidental breakage of a chain-link 19, the amplitude of the consecutive rocking actions of the sectors S involved is limited by the fact that these sectors bear against the splines of the wheel at each corner of their outside periphery.

The graphite used for the shoes is selected from materials having a high density — greater than 1.8 — and very great purity, corresponding to a maximum ash content of 10 ppm (0.001 percent).

Figure 7:
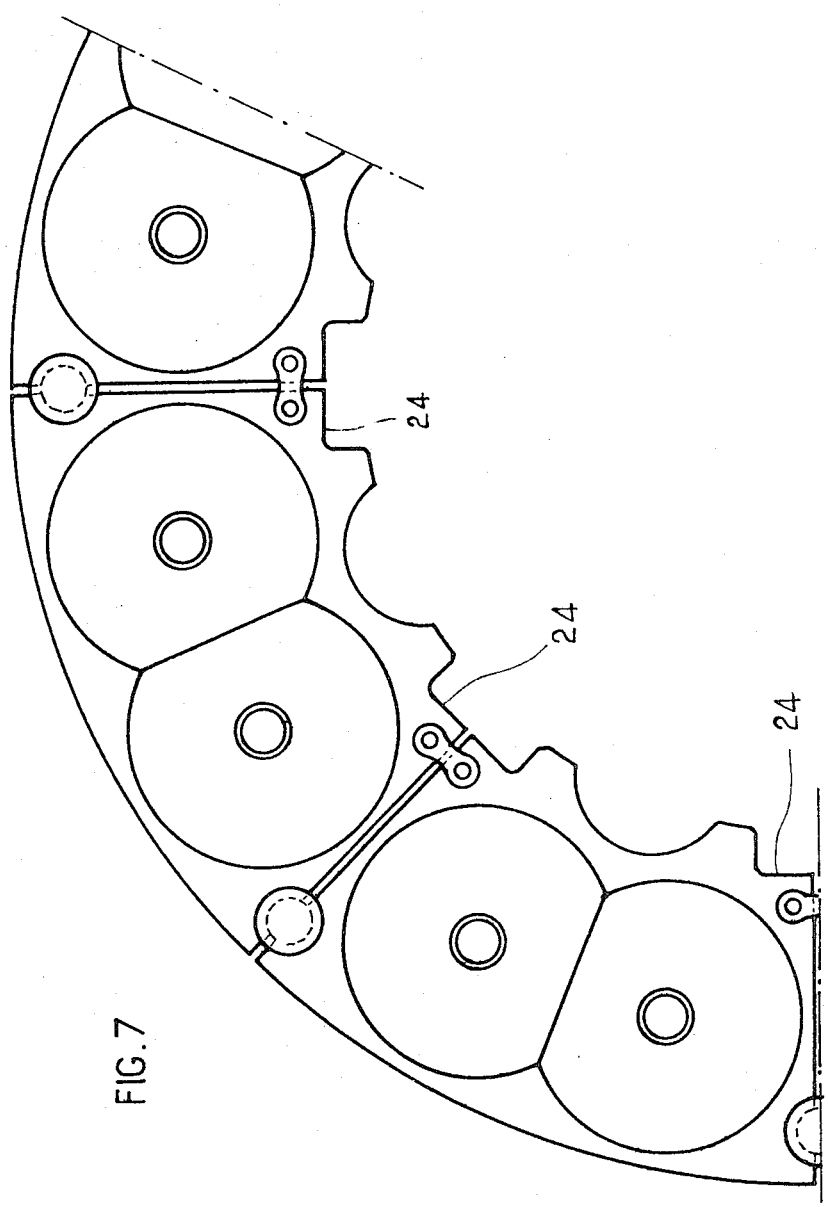
FIG. 7 is an elevational view of a modified form of the segmental stator.

The segmental rotors are associated with stators which are constructed on the same segmental principle as the rotors themselves and are illustrated in FIG. 6 which only differs from FIG. 2 in that the grooves 14 of FIG. 2 are replaced by projections 23 located at the corners of the inside peripheries of the sectors. A modified form of the segmental stator is illustrated in FIG. 7, in which the projections 23 are replaced by grooves 24.

The graphite friction shoes can be associated with shoes made of other materials, for example steel and titanium and their alloys.

For the armatures and coils, use can be made of steel or beryllium or alloys of these metals, or graphite and its constituents.

Figure 8:
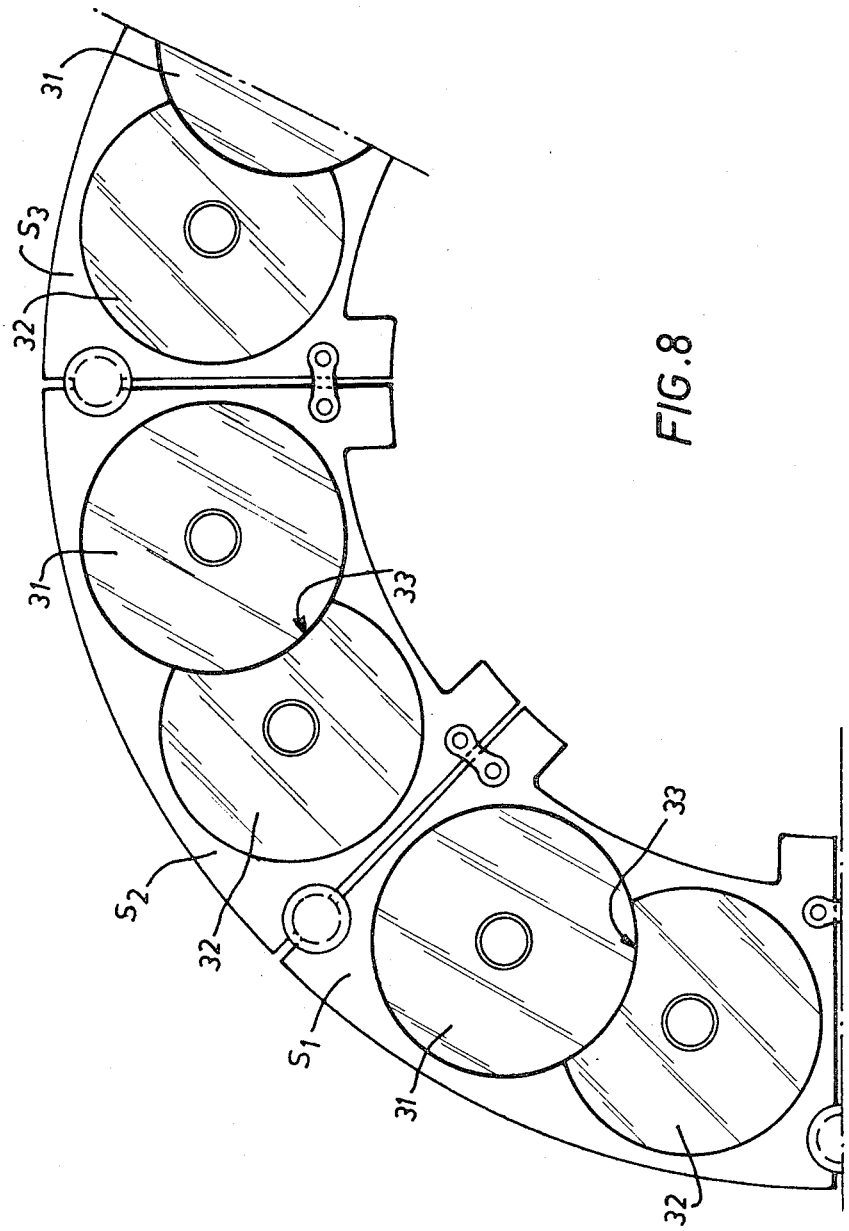
FIG. 8 and 9 are partial elevational views of a stator and rotor fitted with shoes of modified form.
Figure 9:
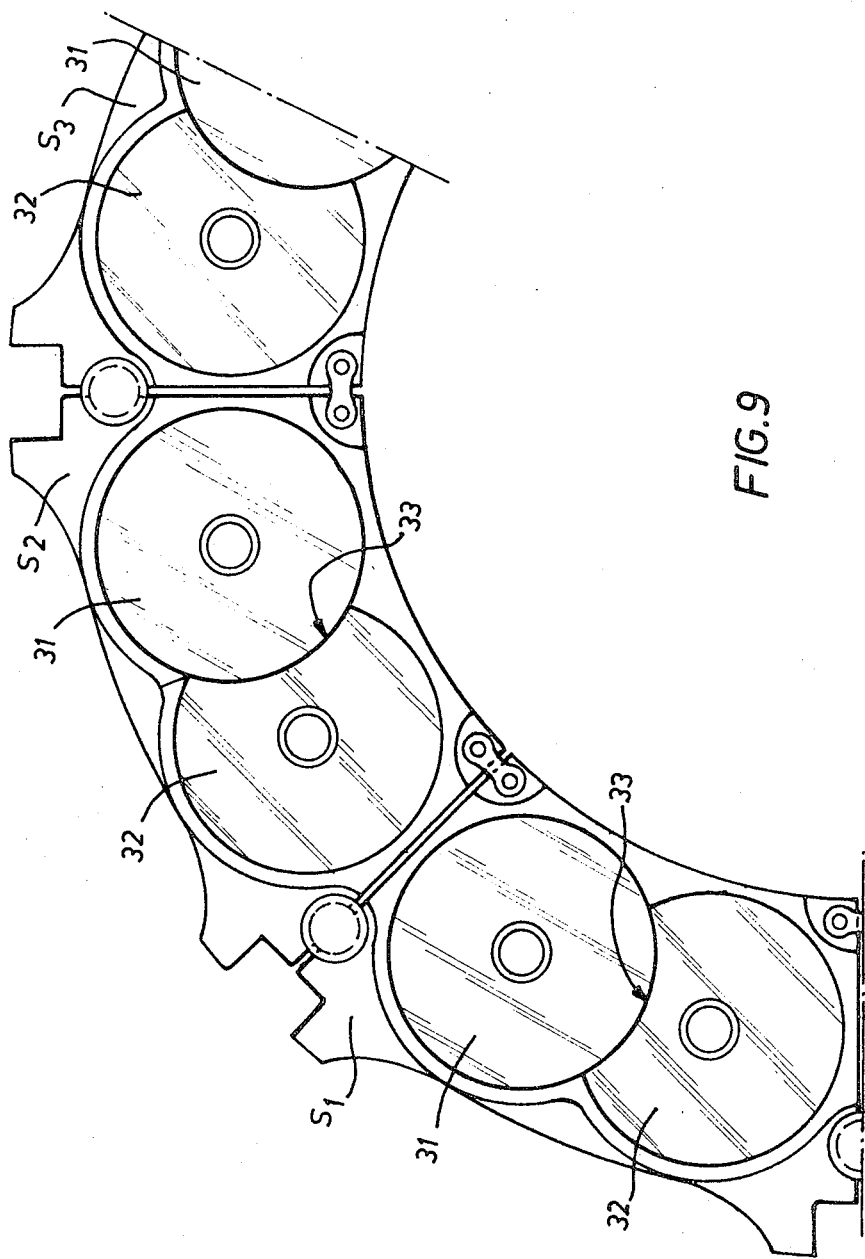

Referring to FIGS. 8 and 9, each sector $S_1$, $S_2$ and $S_3$ contains in each of its faces a cavity of the same shape as those of the previously described arrangements. Inserted in one of the recesses of each cavity is a graphite friction shoe 31 having the form of a complete flat cylinder. Lodged in the second recess is a second friction shoe 32 in the form of a lunule. The inwardly curved portion 33 of the second shoe accommodates in a precise manner that portion of the first shoe that projects from the first recess. An assembly of this kind ensures permanent contact between the shoes along the face of the inwardly curved portion 33 and, consequently, even distribution of the forces set up between the shoes when braking takes place.

According to the invention and in the case where the armatures are made of graphite, a different graphite is selected for the armatures from that used for the shoes, the graphite of the armatures being capable, in particular, of ensuring good mechanical stability of the parts (i.e. resistance to tensile, bending and shear forces). It is possible, for example, to use all products obtained by carbonization or graphitization of filamentary materials, or graphitic fabrics, impregnated with various graphites or carbons reinforced with any kind of fibre.

We claim:

1. A disc brake comprising rotating structures or rotors and non-rotating structures or stators fitted adjacent one another in alternating arrangement inclusive of end structures and intermediate structures, each said intermediate structure including a rim composed of arcuate sectors placed next to each other and interconnected by connection means, said sectors having opposed faces and being provided on each of their faces with a cavity defined by two cylindrical recesses, the walls of which intersect and overlap along an axis of symmetry of the associated sector, two graphite friction shoes collectively defining a shape appreciably corresponding to that of the two recesses of an associated cavity, said friction shoes being fitted into said recesses, and rivets passing through the sector and the shoes located on each side of each sector to secure said shoes in their respective recesses.

2. A disc brake as claimed in claim 1, wherein the shoes housed in any particular cavity are composed of flat cylindrical segments of equal diameter cut off along a rectilinear line along which they are placed side by side in the cavity.

3. A disc brake as claimed in claim 1, wherein one of the shoes in a cavity is composed of a flat cylindrical segment of one piece construction and the other shoe in the same cavity comprises a flat cylindrical segment provided with a recess capable of being fitted precisely on the periphery of the first shoe.

4. A disc brake as claimed in claim 1, wherein the rotor segments and the stator segments are composed of metal, graphite or carbon.

5. A disc brake as claimed in claim 1 wherein the segments of the rotors and of the stators are composed of products obtained by carbonization or graphitization of graphite fabrics or fibers impregnated with varieties of graphite or carbon reinforced with fibers.

6. A disc brake as claimed in claim 1, wherein each rotor sector has an outer circumference with a recess in a corner thereof which, together with the recess in the adjacent sector, defines a groove in which projects a spline integral with the wheel being braked so as to ensure driving of the rotor.

7. A disc brake as claimed in claim 6, wherein each of the rotors is associated with stators having the same segmental structure as the rotors, but in which the recesses are located on the inner periphery of the sectors.

8. A disc brake as claimed in claim 1, wherein each rotor sector has radial edges with a recess therein, the recesses of adjacent sectors defining a housing for receiving a spool which opposes rocking of each sector around a corresponding driving spline of the wheel being braked, each rotor sector additionally having an inner periphery with a groove at each of the two corners thereat, and a chain link including studs effecting assembly of adjacent sectors, said studs being received in said grooves.

9. A disc brake as claimed in claim 8, wherein each of the rotors is associated with stators having the same segmental structure as the rotors but in which the driving recesses are replaced by projections at the corners of their inner periphery.

* * * * *